(12) United States Patent
Greer (10) Patent No.: US 9,249,602 B1
(45) Date of Patent: Feb. 2, 2016

(54) KEY WITH INTEGRATED ATTACHMENT DEVICE

(71) Applicant: Elana Greer, San Juan Capistrano, CA (US)

(72) Inventor: Elana Greer, San Juan Capistrano, CA (US)

(*) Notice: Subject to any disclaimer, the term of this patent is extended or adjusted under 35 U.S.C. 154(b) by 0 days.

(21) Appl. No.: 14/513,443

(22) Filed: Oct. 14, 2014

Related U.S. Application Data (60) Provisional application No. 61/961,444, filed on Oct. 15, 2013.

(51) Int. Cl.
*E05B 19/04* (2006.01)
*F16B 45/02* (2006.01)

(52) U.S. Cl.
CPC ............... *E05B 19/04* (2013.01); *F16B 45/02* (2013.01)

(58) Field of Classification Search
CPC ......... E05B 19/04; E05B 19/00; E05B 19/26; G07C 2009/00992; G07C 2009/00984
USPC ........................................... 70/408, 458, 459
See application file for complete search history.

(56) References Cited

U.S. PATENT DOCUMENTS

| | | | | |
|---|---|---|---|---|
| 1,276,122 A * | 8/1918 | Scheid | ............................ | 119/866 |
| 1,852,950 A * | 4/1932 | Amrhein | ......................... | 70/408 |
| 2,084,260 A * | 6/1937 | Schupbach | ..................... | 70/459 |
| 2,188,367 A * | 1/1940 | Loercher | .......................... | 70/459 |
| 2,241,358 A * | 5/1941 | Schupbach | ..................... | 70/459 |
| 2,551,564 A * | 5/1951 | Clement | ........................ | 70/459 |
| 3,481,169 A * | 12/1969 | Rossi | ............................. | 70/408 |
| 5,775,148 A * | 7/1998 | Layton et al. | ................... | 70/408 |
| 8,134,094 B2 * | 3/2012 | Tsao | .................... | H01H 13/705 200/345 |
| 8,402,800 B1 * | 3/2013 | Hester | .............................. | 70/408 |
| 2002/0166682 A1 * | 11/2002 | Watchko | .................. | C23C 4/00 174/394 |
| 2011/0302970 A1 * | 12/2011 | Amron | ......................... | 70/456 R |

* cited by examiner

*Primary Examiner* — Suzanne Barrett
(74) *Attorney, Agent, or Firm* — IP Strategies (57) ABSTRACT

A key comprises a key blade, a key handle integral with one end of the key blade and forming a portion of a carabiner that includes a generally C-shaped portion integral with said key blade, and a latching element having a first end pivotably attached to a first open end of the C to permit pivoting movement of said latching element between open and closed positions, and a second end overlapping the second open end of the C when said latching element is in said closed position, to limit the pivoting movement of the latching element. In one implementation, the key includes a biasing spring that urges said latching element toward said closed position.

8 Claims, 9 Drawing Sheets

KEY WITH INTEGRATED ATTACHMENT DEVICE

CROSS REFERENCE TO RELATED APPLICATION

This application claims the benefit of U.S. Provisional Patent Application No. 61/961,444, filed Oct. 15, 2013, which is hereby incorporated by reference in its entirety.

FIELD OF THE INVENTION

This invention relates generally to keys and, more particularly, to a key having an integrated attachments device.

BACKGROUND

Keys are difficult to attach and detach from key chains. Keys are also difficult to distinguish from each other. Prior attempts to make a key that is easier to attach or detach are poor solutions, usually because they have been cumbersome to attach and/or detach too easily or are weak and prone to break when twisting in a lock.

In accordance with one embodiment, a key comprises a key blade, a key handle integral with one end of the key blade and forming a portion of a carabiner that includes a generally C-shaped portion integral with the key blade, and a latching element having a first end pivotably attached to a first open end of the C to permit pivoting movement of the latching element between open and closed positions, and a second end overlapping the second open end of the C when the latching element is in the closed position, to limit the pivoting movement of the latching element. In one implementation, the key includes a biasing spring that urges the latching element toward the closed position. The biasing spring may be contained in a cavity in the latching element, with the spring engaging the latching element at one end of the spring and engaging the C-shaped portion at the other end of the spring.

The key blade and the C-shaped portion of the carabiner are preferably formed by a single piece of stamped metal. A pair of rounded polymeric parts may be laminated to opposite sides of the C-shaped portion of the carabiner, and the polymeric parts may be made of a colored material or imprinted with various designs for decorative purposes.

A locking sleeve may be mounted on the latching element for sliding movement along the latching element to telescope over the other open end of the C-shaped portion when the latching element in its closed position, thereby locking the latching element to the C-shaped portion.

BRIEF DESCRIPTION OF THE DRAWINGS

The invention may best be understood by reference to the following description taken in conjunction with the accompanying drawings, in which:

FIG. 6 is a plan view of the top of the key shown in FIG. 1.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
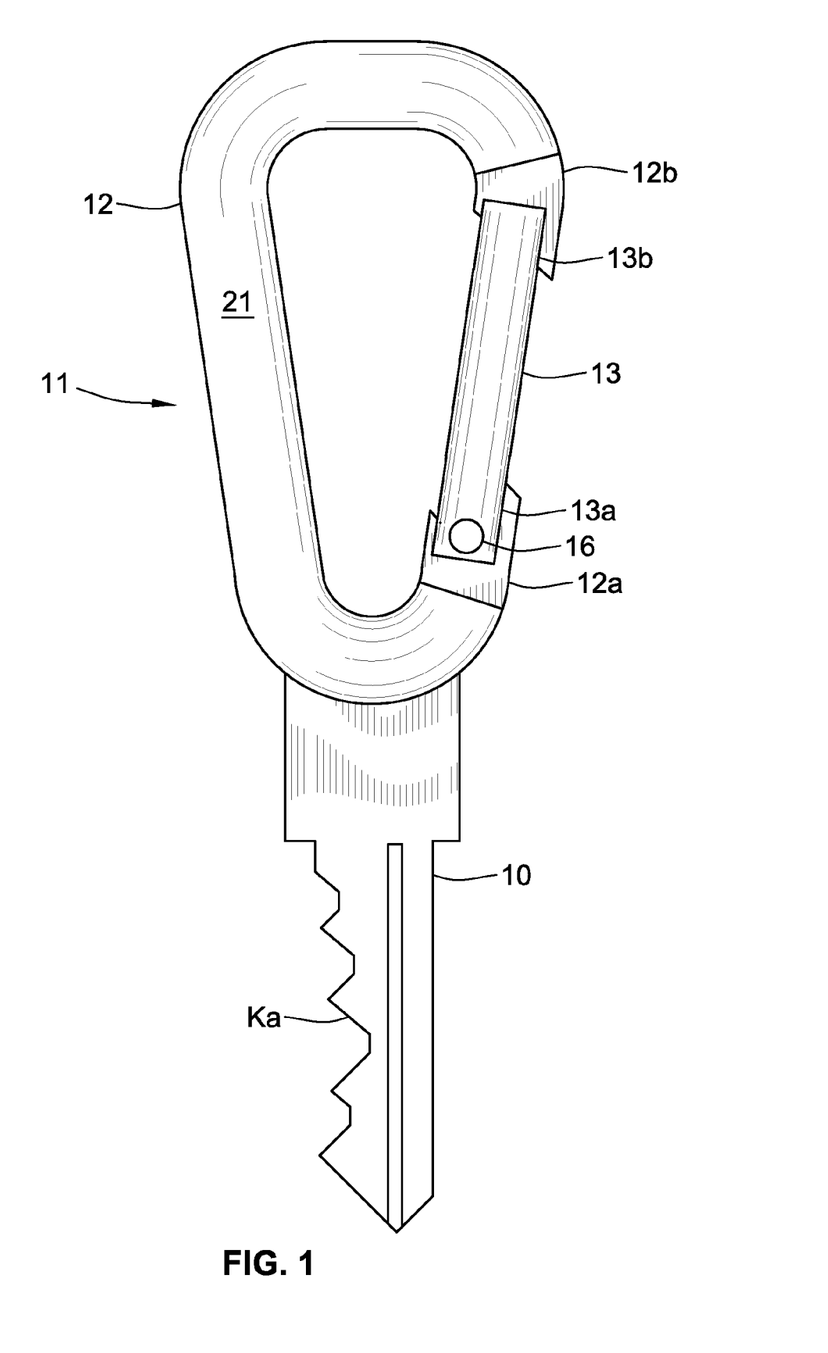
FIG. 1 is a plan view of a flat-blade key having an integrated attachment device, with the attachment device in its closed position.
Figure 6:
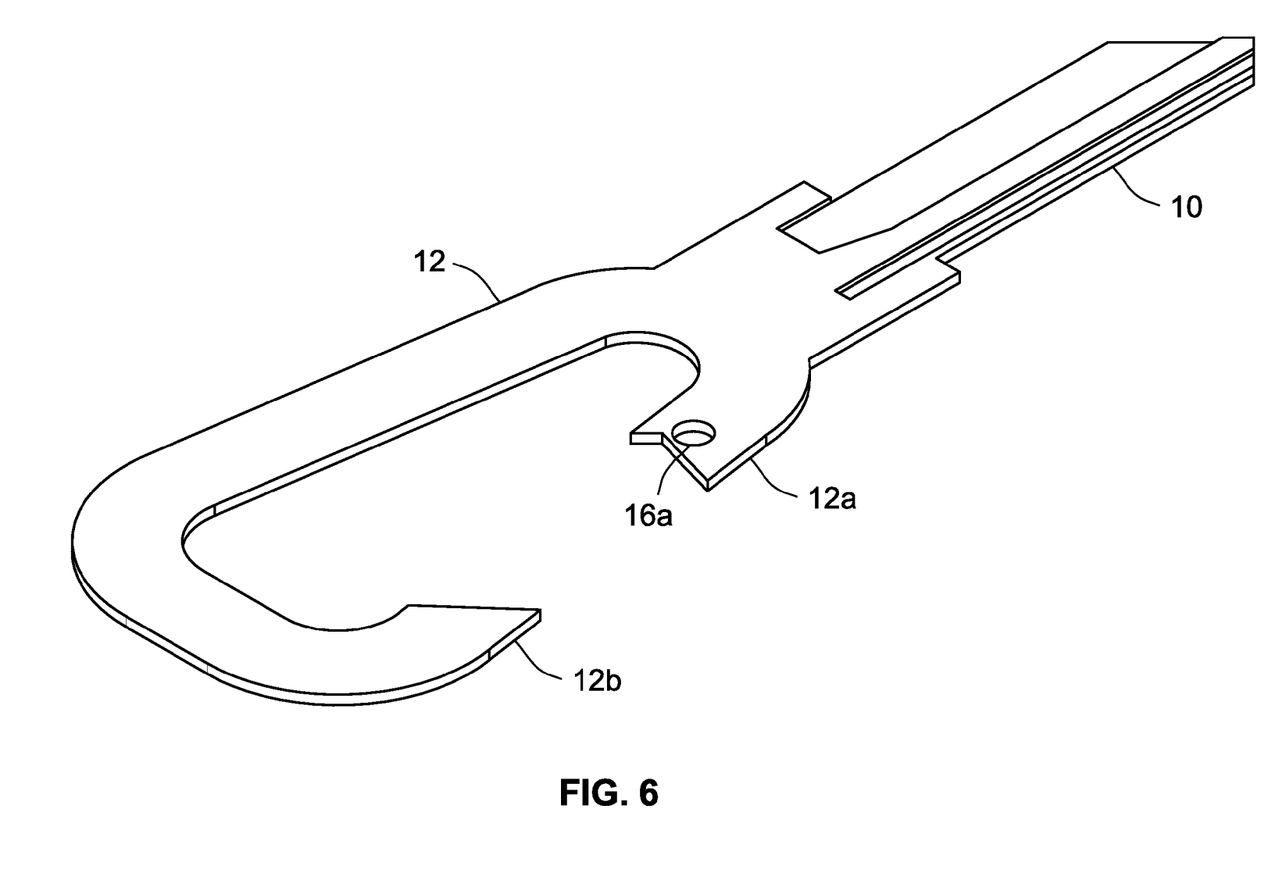
FIG. 6 is a perspective view of the single metal stamping used in the key shown in FIGS. 1-4.
Figure 7:
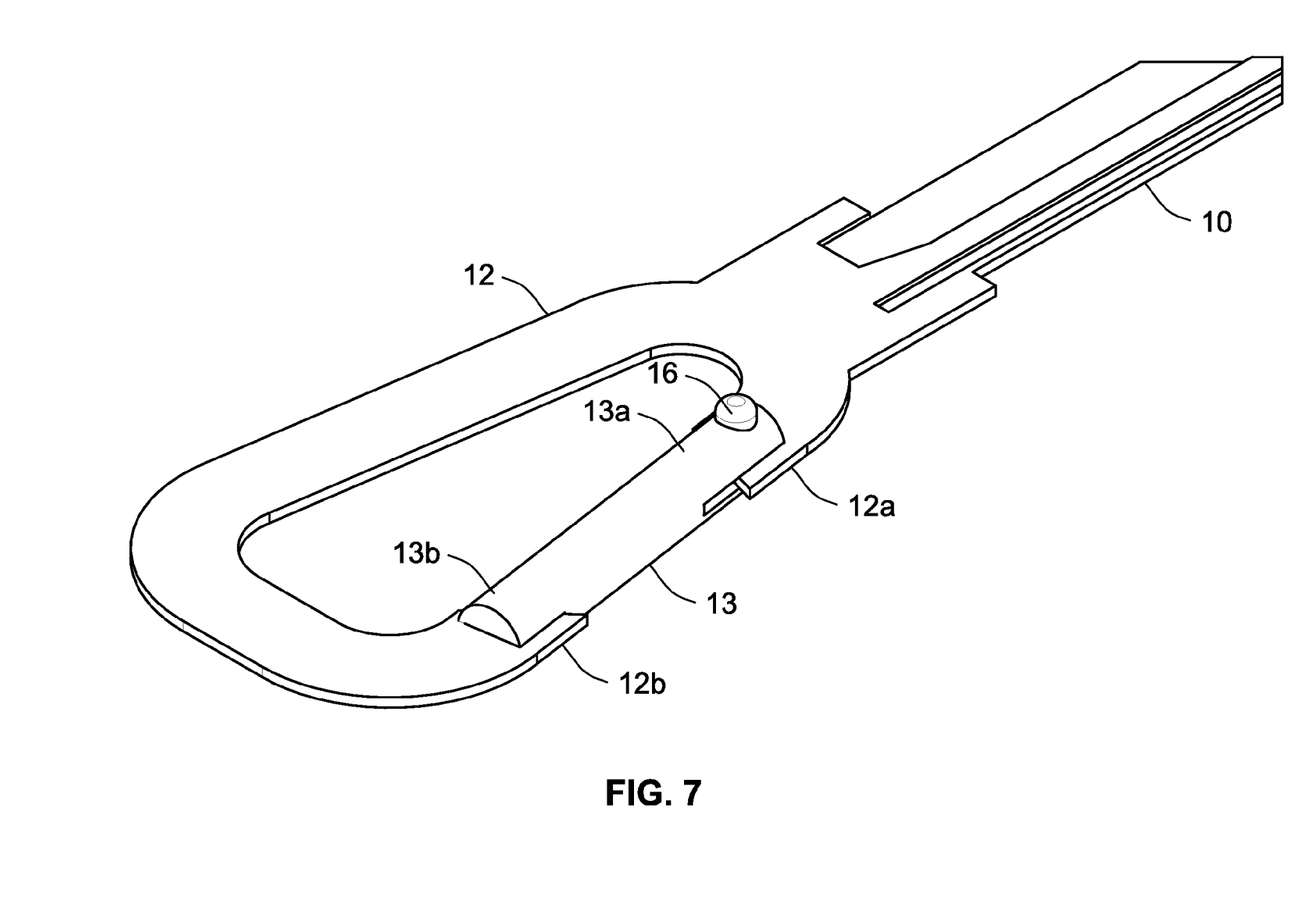
FIG. 7 is a perspective view of the single metal stamping shown in FIG. 6 with the pivoting latching element attached.
Figure 8:
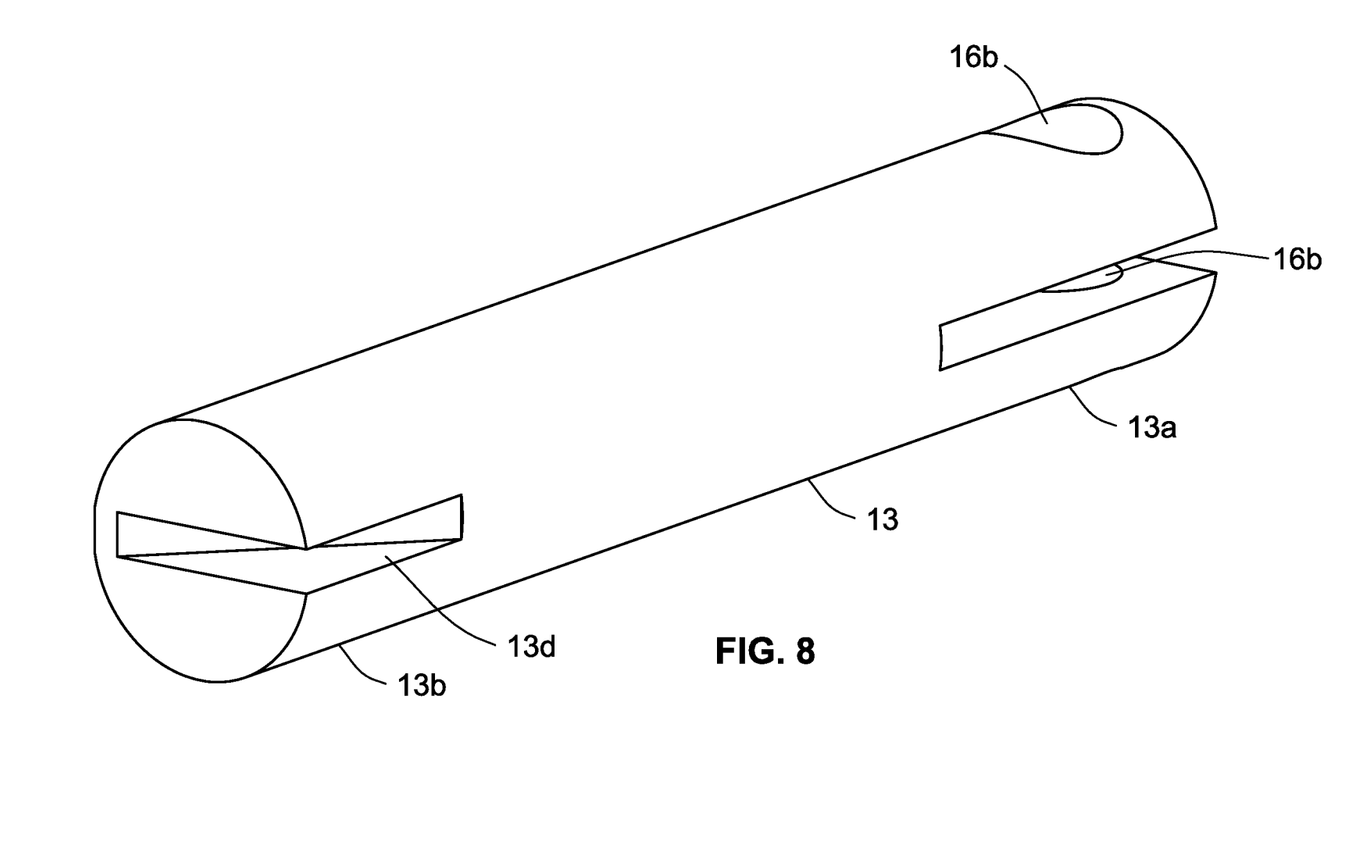
FIG. 8 is an enlarged perspective view of the latching element used in the key shown in FIGS. 1-5 and 7.

Turning now to the drawings and referring first to FIG. 1, a flat-blade key is formed by stamping both the blade 10 and an integral key head 11 from a single piece of metal (see FIG. 6). Teeth 10a are formed in one edge of the blade 10 by cutting notches in that edge of the blade, to form a selected keyway profiles, such as KW1, SC1, WR3 etc. These keyways can accommodate the different types of locks typically used in different types of houses, offices, cars, cabinets, etc. The key head 11 forms a portion of a carabiner that includes a generally C-shaped frame 12 integral with the key blade 10, and a latching element 13 has a first end 13a pivotably attached to a first open end 12a of the C to permit pivoting movement of the latching element 13 between open and closed positions. A second end 13b of the latching element overlaps the second open end 12b of the C when the latching element 13 is in the closed position, to limit the pivoting movement of the latching element 13.

Figure 2:
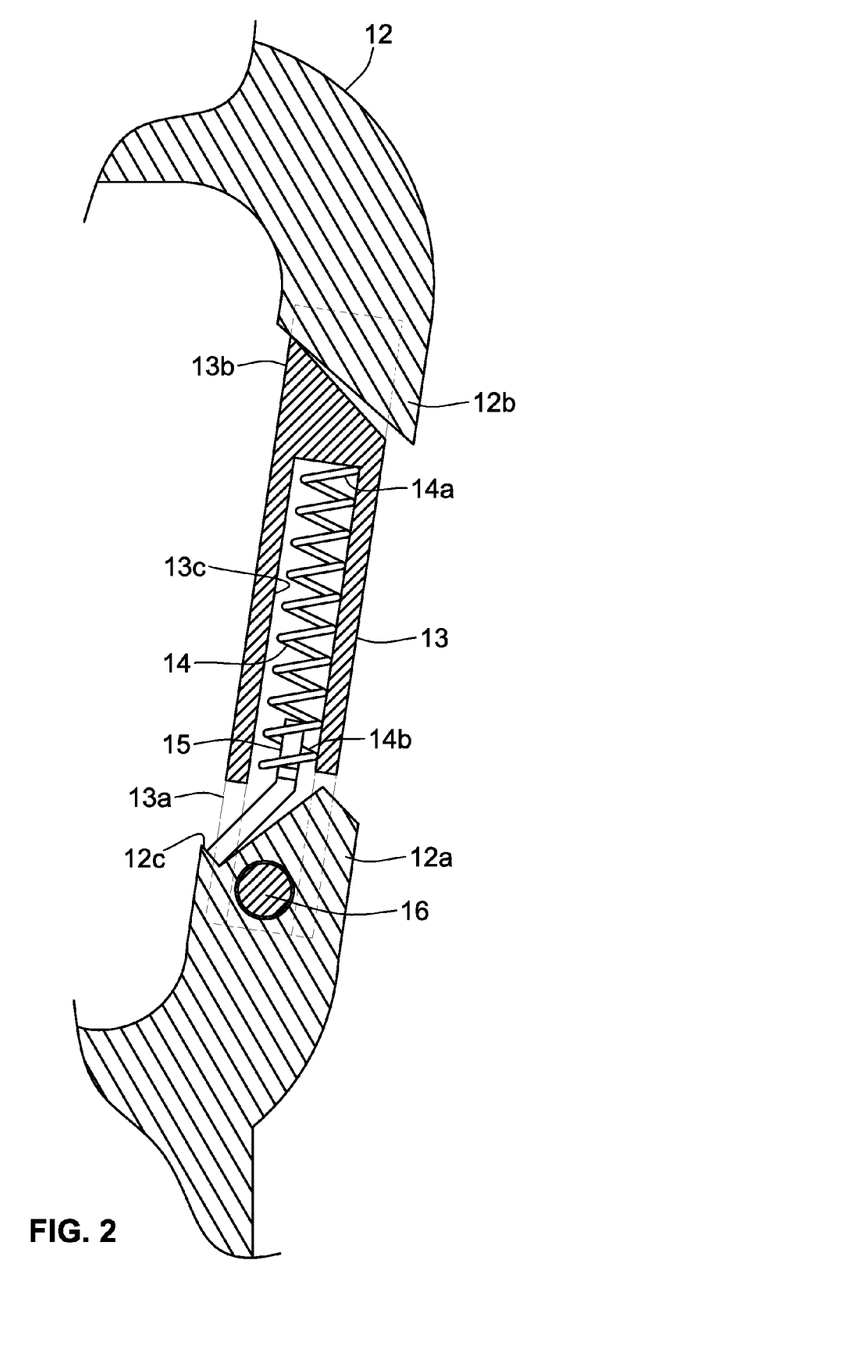
FIG. 2 is an enlarged sectional view of the latching mechanism of the attachment device in the key shown in FIG. 1, with the attachment device in its closed position.
Figure 3:
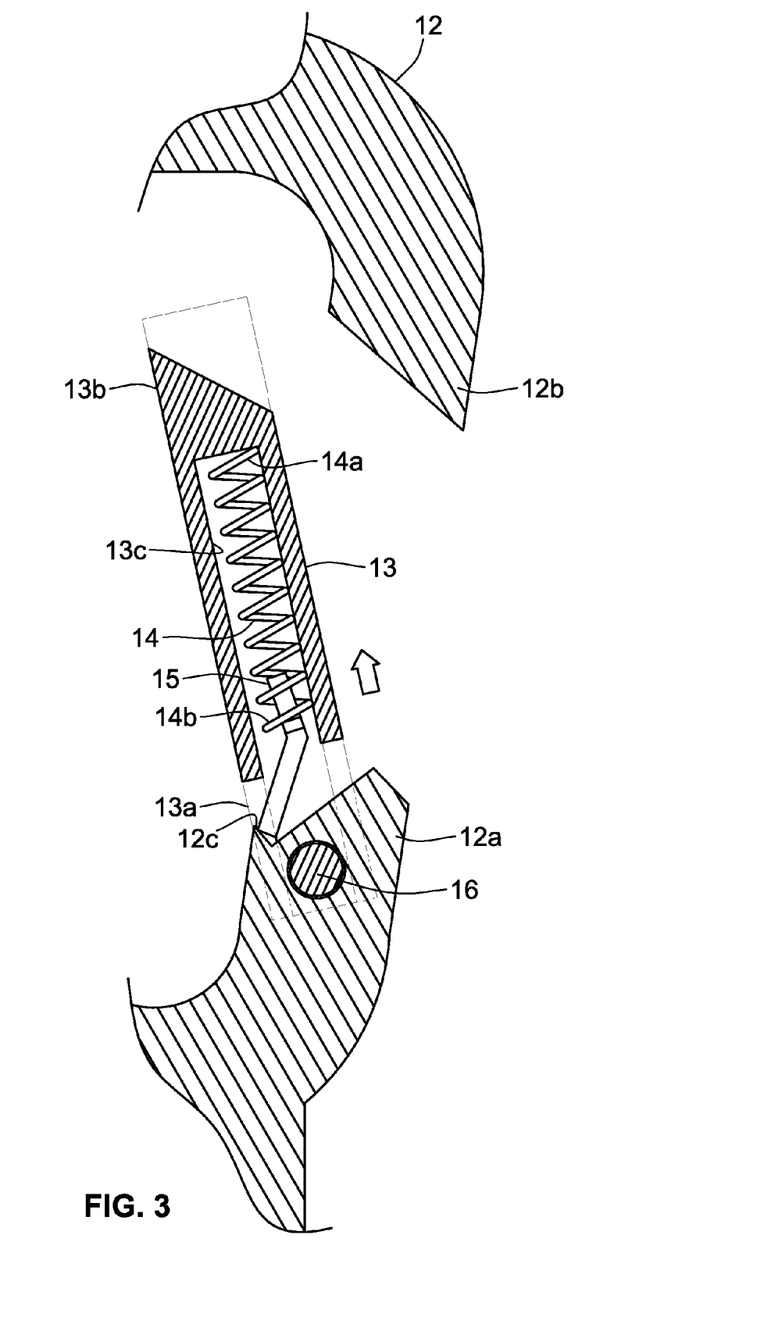
FIG. 3 is the same sectional view shown in FIG. 2, but with the attachment device partially open.
Figure 4:
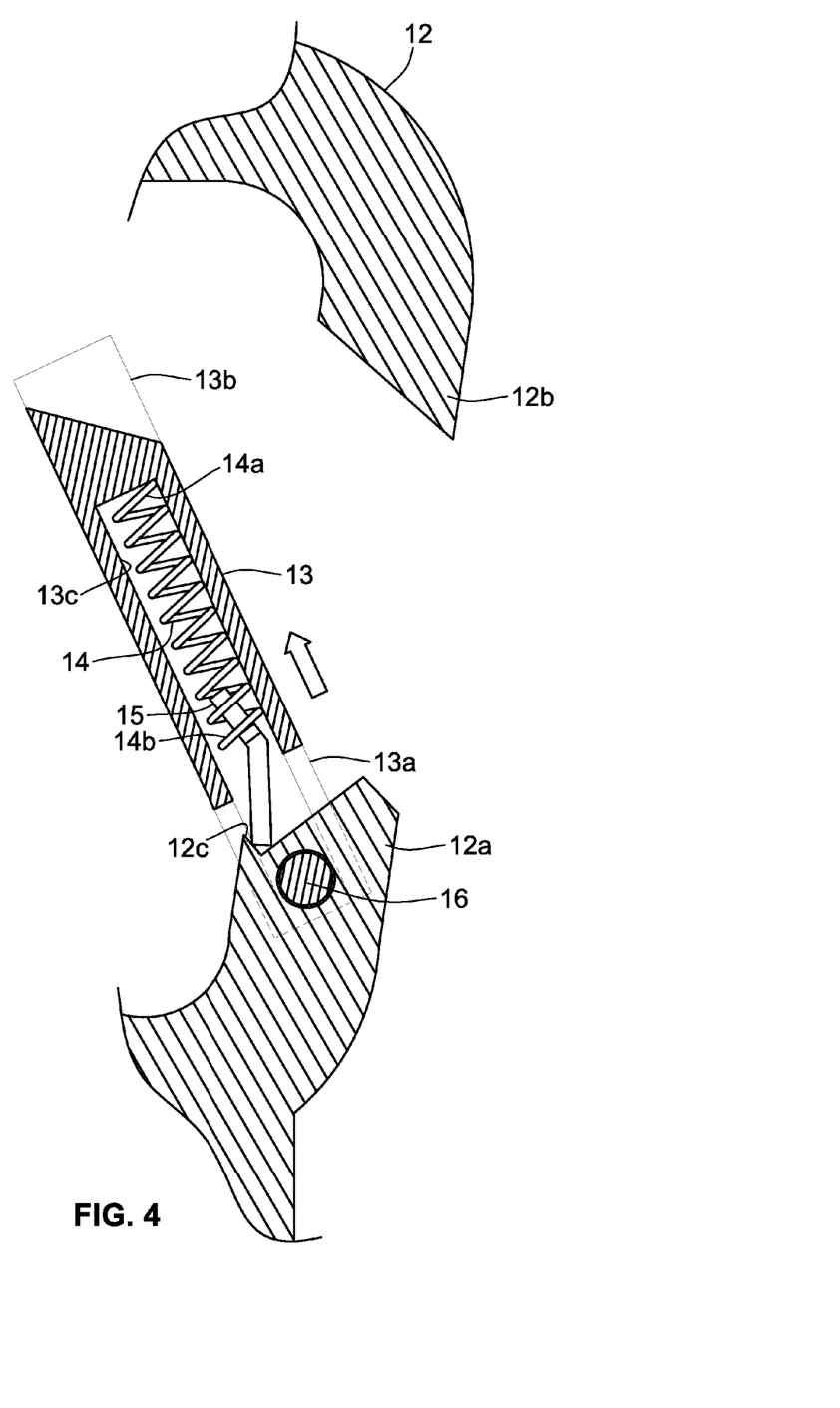
FIG. 4 is the same sectional view shown in FIG. 2, but with the attachment device fully open.

The latching element 13 includes a biasing spring 14 (see FIGS. 2-4 and 9) that urges the latching element 13 toward the closed position. The biasing spring 14 is contained in a cavity 13c in the latching element 13, with the inner end 14a of the spring 14 engaging the latching element 13 at the closed end of the cavity 13a. The outer end 14b of the spring 14 fits over a small angled post 15 that is held in a notch 12c in the open end 12a of the frame 12 by the biasing force of the spring 14 when all the parts are assembled, as illustrated in FIGS. 2-4.

To open the latch, the user manually pushes the latching element 13 inwardly into the C, against the urging of the biasing spring 14. When the manual force is released, the force of the spring 14 returns the latching element 13 to the closed position, with a slot 13d in the end of the latching element 13 fitting over the open end 12b of the C-shaped frame. The bottom wall of the slot 13d and the open end 12b of the C are both angled to block the latching element 13 from ever exiting the C. The opening formed by the C-shaped frame 12 is large enough to accept a multitude of different types of items, such as key rings, belt loops, straps, rope, metal rods and more.

Figure 9:
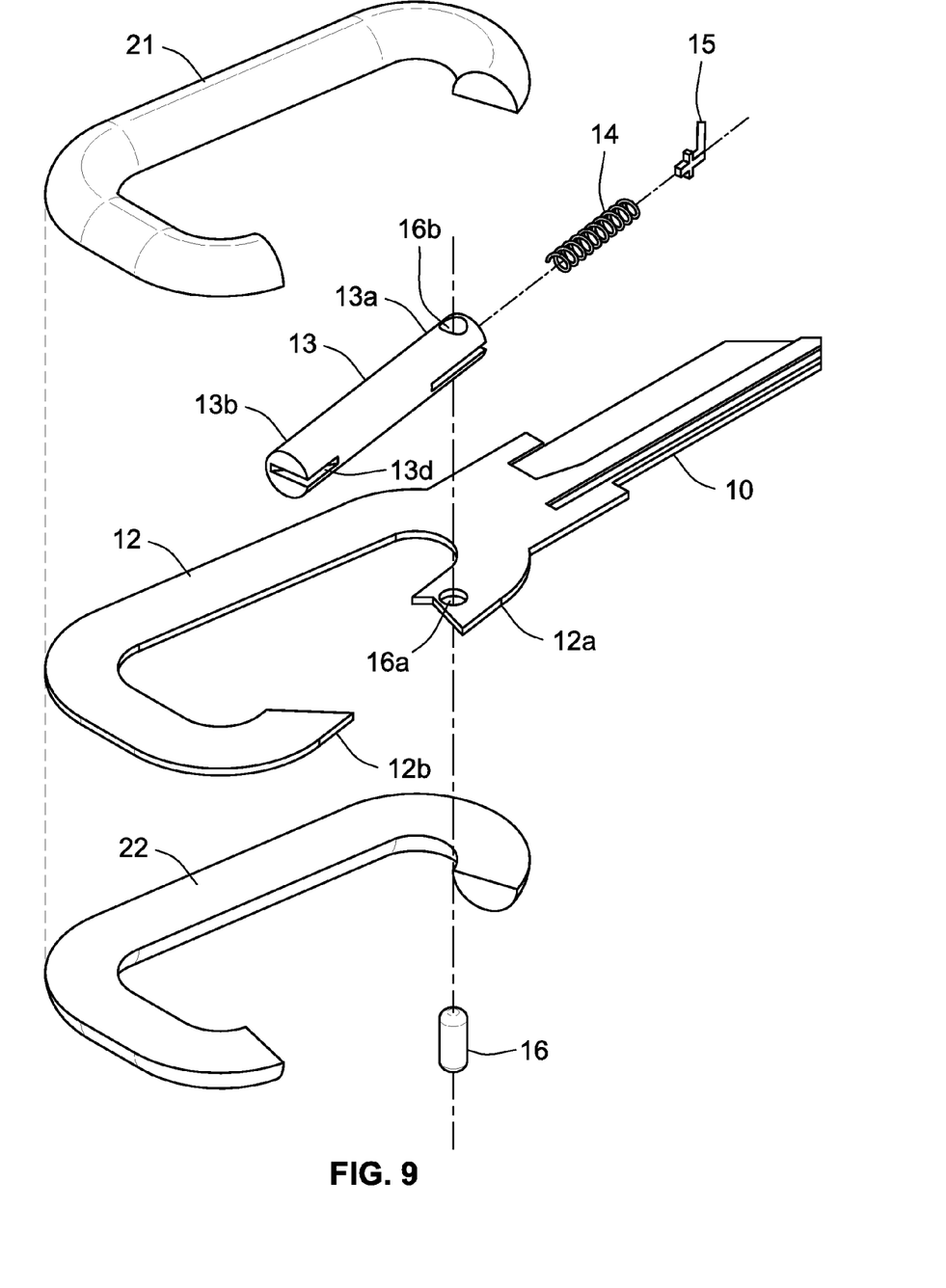
FIG. 9 is an exploded perspective view of the key shown in FIGS. 1-5 and 7.

As can be seen in FIG. 9, the latching element is pivotably attached to the frame end 12a by a pin or rivet 16 that passes through mating apertures 16a and 16b in the frame 12 and the latching element 13. A pin can be held in place by staking the ends of the pin to the latching element, leaving the middle portion of the pin free to rotate within the aperture 16a in the frame 12.

Figure 5:
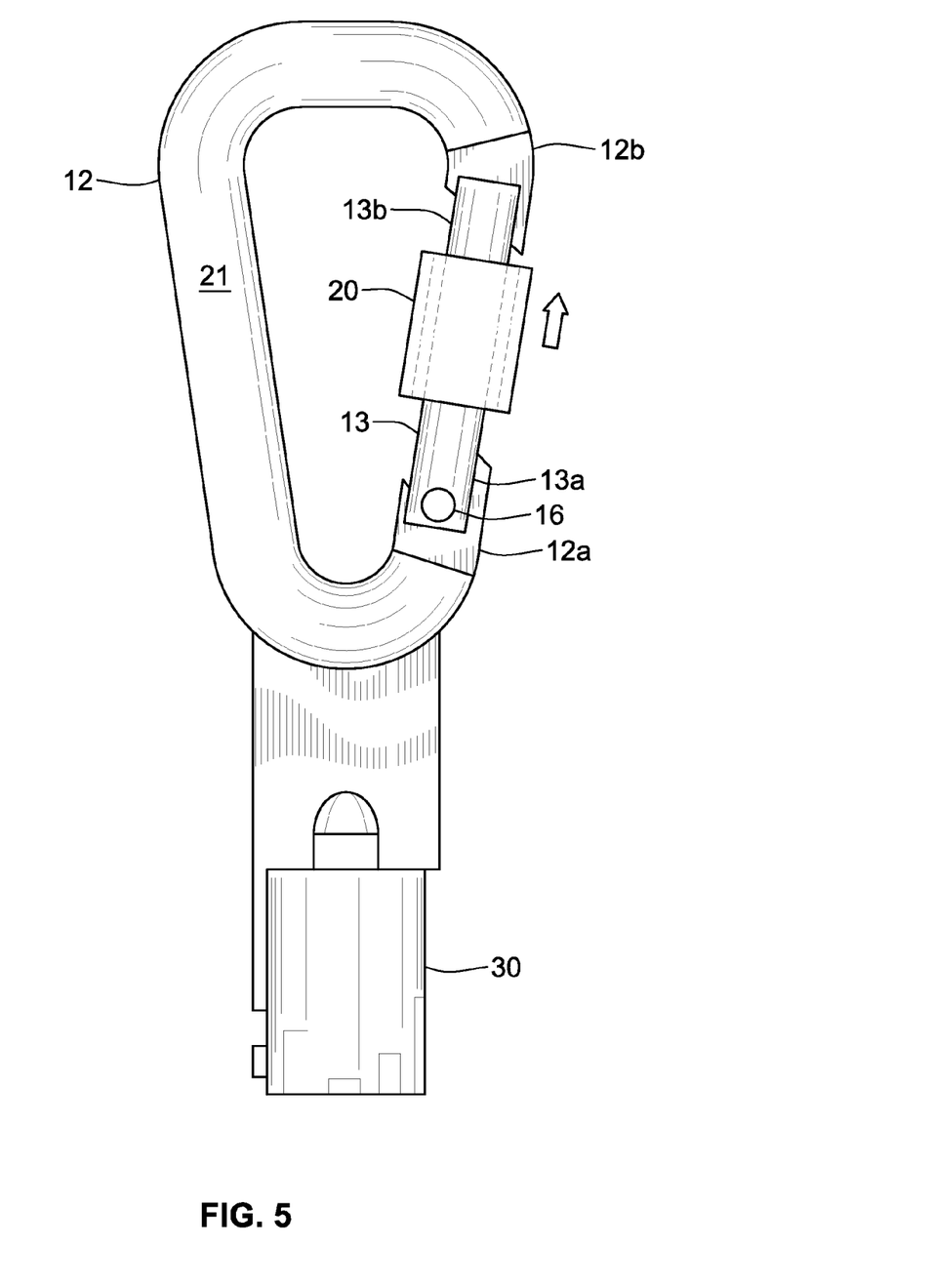
FIG. 5 is a plan view of a round key having an integrated attachment device, which includes a locking sleeve.

FIG. 5 illustrates a modified embodiment in which a locking sleeve 20 is telescoped over the latching element 13. The sleeve 20 is made of an elastic material so that it can be manually expanded to the inside dimension illustrated in broken lines in FIG. 5, thus enabling the sleeve 20 to be pushed over the end 12b of the C-shaped frame 12. A mechanical stop can be formed on the surface of the frame end 12b if desired, to prevent the locking sleeve from being pushed too far onto the frame 12. When manual pressure is released from the sleeve 20, the elastic material causes the sleeve to press snugly against the C end 12b, thereby holding the sleeve 20 in position to prevent the latch end 13b from pivoting inwardly into the C. The sleeve thus provides security to ensure the latch remains closed until the sleeve is manually pushed down along the latching element 13.

FIG. 5 also illustrates a key that has a shank 30 that is round rather than flat, such as the keys commonly used for soft drink machines and other applications. The C-shaped frame can also be made round if desired, to more closely match the shape of the shank.

As can be seen in the exploded view in FIG. 9, a pair of polymeric parts 21 and 22 are laminated to the flat surfaces on opposite sides of major portions of the C-shaped frame. The parts 21 and 22 can be imprinted with decorative designs or advertising, or made of different colors to help users identify one key from another. The parts 21 and 22 can be attached to the hook by molding two pieces of plastic thru connecting holes in the metal that forms the C-shaped frame. These holes can be positioned to both allow the parts 21 and 22 to adhere well and to allow the frame 12 to maintain its maximum strength when being twisted in a lock.

The portion of the C-shaped frame 12 adjacent the blade 10 can be made with an increased thickness to provide added strength to withstand twisting in a key cylinder.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A key comprising
   a key blade,
   a key handle integral with one end of the key blade and forming a portion of a carabiner that includes
      a generally C-shaped portion integral with said key blade, said key blade and said C-shaped portion of said key handle being formed by a single piece of stamped metal having a uniform thickness, and
      a latching element having a first end pivotably attached to a first open end of the C to permit pivoting movement of said latching element between open and closed positions, and a second end overlapping the second open end of the C when said latching element is in said closed position, to limit the pivoting movement of the latching element, and
   a pair of decorative polymeric parts laminated to opposite sides of said C-shaped portion of said key handle.

2. The key of claim 1 in which said first end of said latching device is closer to said blade that said second end.

3. The key of claim 1 which includes a biasing spring that urges said latching element toward said closed position.

4. The key of claim 3 in which said biasing spring is contained in a cavity in said latching element, and engages said latching element at one end of the spring and engages the C-shaped portion at the other end of the spring.

5. The key of claim 1 in which said key blade and said C-shaped portion of said carabiner are formed by a single piece of stamped metal.

6. The key of claim 5 which includes a pair of rounded polymeric parts laminated to opposite sides of said C-shaped portion of said carabiner.

7. The key of claim 6 in which said polymeric parts are decorative.

8. The key of claim 1 which includes a locking sleeve mounted on said latching element for sliding movement along said latching element to telescope over said other open end of said C-shaped portion when said latching element in its closed position, thereby locking said latching element to said C-shaped portion.

* * * * *